United States Patent Office 2,808,339
Patented Oct. 1, 1957

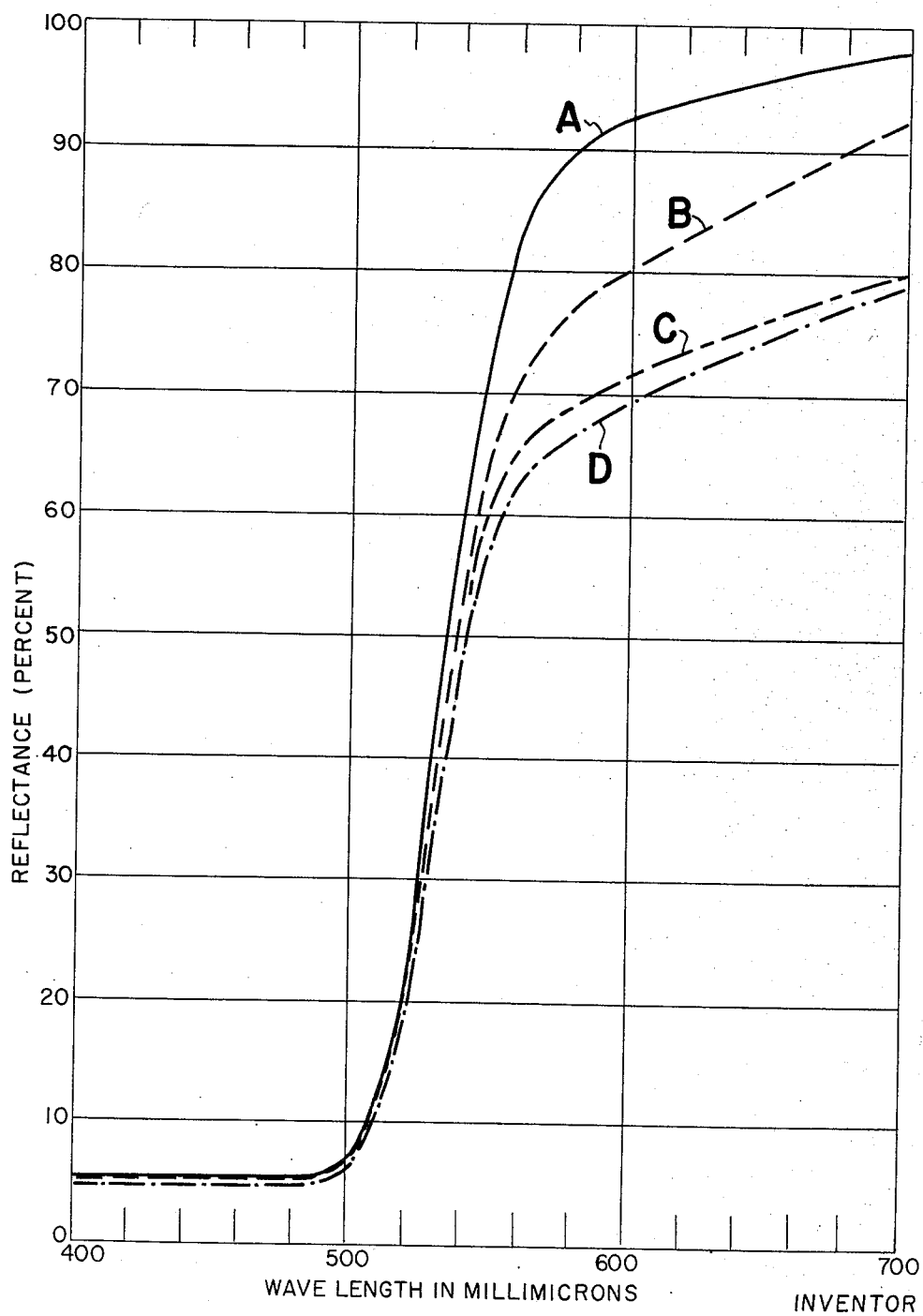

2,808,339

PROCESS FOR IMPROVING LIGHTFASTNESS OF LEAD CHROMATE

Julius Jackson, Westfield, N. J., assignor to E. I. du Pont de Nemours and Company, Wilmington, Del., a corporation of Delaware Application October 16, 1953, Serial No. 386,454

8 Claims. (Cl. 106—298)

This invention relates to novel methods for the manufacture of improved chrome yellow pigments of increased light-fastness.

Lead chromate pigments, commonly known as chrome yellows, always darken when exposed to the actinic rays of sunlight or other forms of intense illumination. This effect is particularly noticeable in the case of compositions such as enamels, printing inks, coated papers, linoleum, plastics, rubber and the like, which are commonly colored with chrome yellow pigments. Many expedients have been resorted to in the past to overcome this deficiency, but complete elimination of the deficiency has not been attained.

An outstanding step in this field comprises that disclosed in U. S. 2,023,928 in which a controlled heat treatment of aqueous slurries of the pigment results in the transformation of the unstable rhombic crystals formed at the time of precipitation to the much more stable monoclinic crystals. Although these products exhibit improved light-fastness, they still lack completely satisfactory properties in this respect in terms of present-day requirements. A further advance in the field came about through the precipitation of selected hydrous oxides on the crystals after heat development. Thus, a treatment with aluminum sulfate under conditions which would form the hydrous aluminum oxide improved the light-fastness, but introduced some undesirable working properties. In U. S. 2,212,917 the incorporation of certain fourth group metal oxides, particularly hydrous titanium oxide, was found to be beneficial and eliminated the disadvantages of hydrous aluminum oxide while obtaining equal or better light-fastness. A further treatment comprises that shown in U. S. 2,365,171 wherein the hydrous oxides of certain rare earth metals are added in addition to the hydrous oxides of titanium and aluminum.

Another approach to the problem, particularly applicable to the lighter shades of yellow which are retained to a substantial degree in the unstable rhombic crystal form, comprises the treatment of the lead chromate with tin salts, antimony compounds and/or reducing agents such as sodium sulfide usually in combination with some hydrous oxide treatment in accordance with U. S. 2,139,453.

In spite of these many advances in the art, chrome yellows still darken disadvantageously on exposure to light and it is a salient object of this invention, therefore, to overcome this disadvantage and to provide novel and improved methods for manufacturing chrome yellow pigments of improved light-fastness. Other objects and advantages will be evident from the ensuing description of the invention.

These objects are accomplished in this invention which comprises incorporating a small amount of a solution of a manganese salt in the precipitated lead chromate pigment suspension and prior to the final step of isolating said pigment from said suspension by filtration.

In one preferred adaptation of the invention, a lead chromate pigment is precipitated in a conventional, well-known manner as by adding a solution of lead nitrate ($Pb(NO_3)_2$) to a slightly alkaline solution of sodium chromate (which may contain more or less sodium sulfate) so that the final pH is about 6.0. This suspension is then heated to convert it to the monoclinic crystal form. It has been customary in the past to treat the pigment at this stage with various hydrous oxides such as alumina hydrate or hydrous $TiO_2$, or both, by adding the appropriate soluble salts and precipitating the hydrous oxide with soda ash, to give desired improvements in working properties and some improvement in light-fastness. In accordance with this invention, a further desired improvement in light-fastness is effected by adding a solution of a manganese salt, such as manganese sulfate, so that it is present during the precipitation of the other hydrous oxides.

To a clearer understanding of the invention, the following specific examples are given, none of which are to be construed as in limitation of my invention:

*Example I*

A solution of 165 parts of lead nitrate ($Pb(NO_3)_2$) in 2000 parts of water at 20° C. is adjusted to a pH of 3.3, and added in about 10 minutes to a solution of 79.4 parts of sodium chromate ($Na_2CrO_4$) and 4.0 parts of sodium sulfate in 2000 parts of water at 20° C. and adjusted to a pH of 7.7. After mixing these solutions, the pH of the pigment suspension should be in the range of 5.8–6.2. The suspension is then heated rapidly to about 93° C. and held at 93° C. for about 30 min. Then, a solution of 16 parts of alum ($Al_2(SO_4)_3.18H_2O$) in 90 parts of water is added, followed after about 2 minutes with a solution of 10 parts manganese sulfate ($MnSO_4.H_2O$) in 100 parts of water and then, after 2 minutes, a solution of titanyl sulfate ($TiOSO_4$) equivalent to 3.4 parts $TiO_2$ in 50 parts water. Finally, a solution of 28 parts sodium carbonate in 280 parts of water is added to give a pH of about 6.0. The suspension is then filtered, washed free of soluble salts, dried and pulverized.

When this pigment is dispersed in a coating composition vehicle, such as an alkyd resin solution, panels made from this enamel exhibit a slightly darker and slightly duller masstone and a somewhat greener and duller tint than the equivalent pigment which has not been treated with the manganese salt. However, when these panels are exposed to the sunlight, the further darkening of the panel made from the pigment of this example is very slight and very much less than that from the untreated control pigment.

These differences can be readily shown in spectrophotometric curves of the panels before and after exposure to the light. The accompanying drawing shows a set of spectrophotometric curves in which the percent reflectance in terms of a standard white is plotted vs. the wave length of light across the visual field.

Curve A is that of a pigment of Example I, but having no manganese treatment before exposure to light;

Curve B is the same pigment after exposure to light;

Curve C is the manganese-treated pigment of said example before exposure to light; while Curve D is the same manganese-treated pigment after exposure to light.

It will be readily apparent that the difference between curve D and curve C is very much less than the difference between curves B and A.

*Example II*

A solution of 165 parts of lead nitrate ($Pb(NO_3)_2$) in 1250 parts of water at 20° C. and pH 3.3 is added rapidly to a solution of 73.2 parts sodium chromate $Na_2CrO_4$ and 15.0 parts of sodium sulfate $Na_2SO_4$ in 1250 parts of water at 20° C. and pH 7.5. After precipitation the pH is adjusted to 6.0 and the suspension is heated rapidly to about 93° C. and held at that temperature for 15 min. after which there are added, in turn, as in Example I, solutions of:

8 parts aluminum sulfate ($Al_2(SO_4)_3 \cdot 18H_2O$) in 400 parts water
10 parts manganese sulfate ($MnSO_4 \cdot H_2O$) in 100 parts water
2 parts titanyl sulfate (calculated as $TiO_2$) in 50 parts water The pH is then adjusted to 6.4 with about 20 parts of sodium carbonate in 10% solution and the suspension is filtered, washed free of soluble salts, dried and pulverized.

This pigment is lighter and greener than that of Example I, but in other respects the properties are similar.

*Example III*

A solution of 25 parts sodium carbonate in 200 parts of water is added rapidly to a solution of 165 parts lead nitrate ($Pb(NO_3)_2$) in 2000 parts of water at 20° C. and pH 4.3. After stirring 4 minutes, there is added, in about 30 minutes, a solution of 64 parts sodium chromate ($Na_2CrO_4$) and 5.5 parts of sodium sulfate ($Na_2SO_4$) in 500 parts of water at 20° C. and adjusted to pH 8.4. Then there is added in turn solutions of—

5 parts sodium sulfate ($Na_2SO_4$) in 50 parts of water
2 parts stannous chloride ($SnCl_2 \cdot 2H_2O$) in 20 parts of water
2 parts manganese sulfate ($MnSO_4 \cdot H_2O$) in 100 parts of water The pH is then adjusted to about 6.0 with about 2.3 parts of sodium carbonate and the suspension is filtered, washed free of soluble salts, dried and pulverized.

When dispersed into a vehicle and used as a coating composition, this pigment shows much less darkening on exposure to sunlight than the comparable pigment made without the manganese salt.

To be effective in attaining the benefits of my invention, it is critical and essential that the manganese salts used as treating agents shall be applied to the already-formed lead chromate pigment in aqueous suspension and not coprecipitated therewith. Furthermore, they are of significant value only when used in conjunction with certain hydrous oxides, such as hydrous aluminum oxide and hydrous titanium dioxide, and are most effective when not comprising the first treating agent added to the pigment suspension, but when present at the time of the final precipitation of the hydrous oxides with alkali.

The amount of manganese salt used in effecting the treatment can vary over a considerable range. Thus, as little as 0.5% (calculated as $MnSO_4 \cdot H_2O$) based on the final lead chromate pigment, is effective in some instances and, at the other extreme, as much as 7% can be used in many cases. For most purposes the preferred amount, ranging from about 3–5%, can be employed.

While the examples show the use of manganese sulfate as the preferred source of manganese, this is only because it is the most readily available salt. Obviously, other soluble salts of manganese can be used, such as manganese chloride and manganese nitrate, with equally effective results when used on an equivalent weight basis. Likewise, potassium permanganate ($KMnO_4$) has been successfully used and appears to have its optimum effect in the range of about 1%.

The reason for the beneficial effect of the treatment with the manganese compound herein contemplated is not presently fully understood, particularly since only a small fraction of the manganese used is retained in any form in the final pigment. It has been speculated that the darkening of lead chromate pigments on exposure to sunlight is the result of a reduction of the chromate by the organic vehicle in the presence of ultra-violet light. It has also been observed that the reduction of chromate ion by sulfite is inhibited by the presence of manganous ions, and it is considered possible that the manganese used in treating these pigments may also be inhibiting the reduction of the lead chromate under the influence of light.

The products of this invention are useful as pigments of improved light-fastness. They are particularly useful in paint vehicles, enamels and finishes and similar coating compositions.

While specific lead salts have been used in the examples, it will be understood that all organic or inorganic lead salts (nitrates, acetates, etc.) suitable for reaction with a solution of a chromate to precipitate a normal or basic lead chromate pigment are contemplated for use. Similarly, while aluminum sulfate and titanyl sulfate have been mentioned as reactants for precipitating hydrous oxides in conjunction with the contemplated manganese treatment, it will be understood that other soluble salts of titanium and aluminum, including their nitrates or mixtures of such salts, can be used. Similarly, the term "lead chromate," as herein used, includes all types of lead chromate pigments, and particularly those consisting essentially of lead chromates with varying quantities of lead sulfate, carbonate and diluents. They can be obtained in a great variety of shades including the so-called chrome greens.

Furthermore, while specific amounts of certain hydrous metal oxides have been mentioned, it will be understood that the invention is not restricted thereto. In attaining optimum results herein, use is effected of an amount of a soluble salt or mixtures of such salts as will precipitate a minor amount of the hydrous metal oxide or oxides on the pigment, such amount ranging from substantially 1% to 5%, calculated as the oxide of the metal or metals so employed and based on the weight of the pigment. Preferably, recourse is had to the soluble salts of titanium or other metals of the first subgroup of group IV and group V of the periodic table which are easily hydrolyzed in acid or alkaline solutions and form insoluble white or colorless hydrous oxides. Specifically, these include the soluble salts of hafnium, thorium, columbium, tantalum, antimony, and bismuth, particularly their sulfates, nitrates, and chlorides, with the hydrous metal oxide treatment being effected in accordance with the disclosure of U. S. Patent No. 2,212,917.

I claim as my invention:

1. In a process for improving the light-fastness of a lead chromate pigment by precipitating a hydrous metal oxide selected from the group consisting of aluminum, titanium, tin, hafnium, thorium, columbium, tantalum, antimony, bismuth and mixtures thereof, in the presence of said pigment in aqueous suspension and then recovering the lead chromate pigment with improved light-fastness, the improvement which comprises precipitating said hydrous oxide in the aqueous suspension of the lead chromate in the presence of from about 0.5% to 7% of a water-soluble, inorganic manganese salt, calculated as $MnSO_4 \cdot H_2O$ and based on the final pigment weight.

2. The process of claim 1 in which the hydrous metal oxide is hydrous titanium oxide.

3. The process of claim 1 in which the hydrous metal oxide is hydrous aluminum oxide.

4. The process of claim 1 in which the hydrous metal oxide is hydrous tin oxide.

5. The process of claim 1 in which the hydrous metal oxide is a mixture of hydrous aluminum oxide and hydrous titanium oxide.

6. In a process for improving the light-fastness of a lead chromate pigment by precipitating a hydrous metal oxide selected from the group consisting of aluminum, titanium, tin, hafnium, thorium, columbium, tantalum, antimony, bismuth and mixtures thereof, in the presence of said pigment in aqueous suspension, and then recovering the lead chromate pigment with improved light-fastness, the improvement which comprises precipitating said hydrous metal oxide in the aqueous suspension of the lead chromate in the presence of from about 3% to 5% of manganese sulfate, based on the final pigment weight.

7. The process of claim 6 in which the hydrous metal oxide is titanium oxide.

8. The process of claim 6 in which the hydrous metal oxide is a mixture of hydrous aluminum oxide and hydrous titanium oxide.

References Cited in the file of this patent

UNITED STATES PATENTS

| | | |
|---|---|---|
| 2,365,171 | Botti | Dec. 19, 1944 |
| 2,430,589 | Sloan | Nov. 11, 1947 |